United States Patent
Reitmeier et al.

(10) Patent No.: US 6,215,938 B1
(45) Date of Patent: *Apr. 10, 2001

(54) FIBER OPTIC CABINET AND TRAY

(75) Inventors: Wade P. Reitmeier, Annandale; Clinton M. Knudsen, St. Louis Park, both of MN (US)

(73) Assignee: ADC Telecommunications, Inc., Minnetonka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,182

(22) Filed: Sep. 21, 1998

(51) Int. Cl.⁷ ..................................................... G02B 6/00
(52) U.S. Cl. ............................................ 385/135; 385/134
(58) Field of Search .................................... 385/134, 135, 385/136, 137, 147

(56) References Cited

U.S. PATENT DOCUMENTS

| | | | |
|---|---|---|---|
| Re. 34,955 | 5/1995 | Anton et al. | 385/53 |
| 4,359,262 | 11/1982 | Dolan | 385/135 X |
| 4,373,776 * | 2/1983 | Purdy | 385/135 |
| 4,687,289 | 8/1987 | DeSanti | 385/135 X |
| 4,765,709 * | 8/1988 | Suillerot et al. | 385/135 |
| 4,770,357 * | 9/1988 | Sander et al. | 385/135 X |
| 4,792,203 | 12/1988 | Nelson et al. | 385/135 X |
| 4,898,448 * | 2/1990 | Cooper | 385/135 |
| 4,913,512 * | 4/1990 | Anderton | 385/135 |
| 5,066,149 | 11/1991 | Wheeler et al. | 383/135 |
| 5,069,523 | 12/1991 | Finzel et al. | 385/135 |
| 5,074,635 | 12/1991 | Justice et al. | 385/95 |
| 5,093,885 | 3/1992 | Anton | 385/134 |
| 5,115,489 | 5/1992 | Norris | 385/135 |
| 5,131,066 * | 7/1992 | Foss | 385/135 |
| 5,187,766 * | 2/1993 | Finzel et al. | 385/135 |
| 5,189,724 * | 2/1993 | Hartley | 385/135 |
| 5,208,894 | 5/1993 | Johnson et al. | 385/135 |
| 5,247,603 | 9/1993 | Vidacovich et al. | 385/135 |
| 5,249,252 | 9/1993 | Noto | 385/135 |

(List continued on next page.)

FOREIGN PATENT DOCUMENTS

| | | | |
|---|---|---|---|
| 2579330 | 3/1985 | (FR) | 385/135 X |
| WO 95/07480 | 3/1995 | (WO) | 385/135 X |
| WO 96/10203 | 4/1996 | (WO) | 385/135 X |
| WO 00/17693 | 3/2000 | (WO) | 385/135 X |

OTHER PUBLICATIONS

ADC Telecommunications FL2000 Splice Panel Installation Instructions, 12 pages, Issue 5, Jan. 1998.

ADC Telecommunications FlexLight 2000™ System Planning and Application Guide, 1st Edition, Issue 1, Apr. 1994, 44 pages.

ADC Telecommunications brochure entitled "AGX 72 Fiber Outside Plant Panel," 4 pages, dated Jan. 1995.

ADC Telecommunications catalog entitled "FL2000 System Second Edition," dated Jan. 1995, 43 pages.

ADC Telecommunications catalogue entitled "Fiber Panel Products Second Edition," 117 pages, dated Jul. 1996.

Primary Examiner—Brian Healy
(74) Attorney, Agent, or Firm—Merchant & Gould P.C.

(57) ABSTRACT

A fiber optic cabinet has internal aligned guides on opposite sides of an axis opening. A splice tray has a planar tray base with a tray axis orthogonal to the base. The base has a peripheral edge sized for opposite portions of the peripheral edge to be slidably engaged with opposing ones of the aligned cabinet guides. The tray base is slidably received within the aligned guides regardless of a rotational position of the tray base about the tray axis. A fiber pathway guide is carried on the tray base for receiving a wound amount of optical fiber on the guide as the tray base is rotated about the tray axis.

52 Claims, 7 Drawing Sheets

U.S. PATENT DOCUMENTS

| | | | |
|---|---|---|---|
| 5,323,479 | * | 6/1994 | Allen .................................... 385/135 |
| 5,481,639 | | 1/1996 | Cobb et al. ........................... 385/135 |
| 5,511,144 | | 4/1996 | Hawkins et al. ..................... 385/135 |
| 5,519,804 | | 5/1996 | Burek et al. .......................... 385/135 |
| 5,544,273 | * | 8/1996 | Harrison ................................ 385/135 |
| 5,717,811 | | 2/1998 | Macken ................................. 385/135 |
| 5,768,463 | * | 6/1998 | Foss et al. ............................ 385/135 |
| 5,778,131 | * | 7/1998 | Llewellyn et al. .................... 385/135 |

* cited by examiner

FIBER OPTIC CABINET AND TRAY

I. BACKGROUND OF THE INVENTION

1. Field of the Invention

This invention pertains to equipment for use in fiber optic telecommunications. More particularly, this invention pertains to a cabinet and tray for holding fiber optic cables.

2. Description of the Prior Art

There are numerous examples of cabinetry for holding fiber optic cables. Such cabinetry can include structure for holding excess lengths of cables as well as performing various functions with cables. Such functions may include splice functions for joining two fiber optic cables. Such equipment is designed to facilitate an orderly arrangement of fiber optic cables. In a telecommunications center, numerous cables are present. It is desired that such equipment can organize the cables and permit access to the cables in an orderly manner.

Examples of fiber optic equipment includes cabinets disclosed in U.S. Reissue Pat. No. 34,955 reissued May 30, 1995 on U.S. Pat. No. 4,995,688. This patent describes a variety of cabinets which are interchangeable in a common frame. A specific embodiment of the cabinets include a cabinet for storing excess lengths of fibers. This cabinet is illustrated in FIGS. 29 through 32 of Reissue Pat. No. 34,955. The storage cabinet includes a plurality of sliding trays each of which contains a rotatable spool for holding fibers. Rotating the spool permits excess lengths of fibers to be stored on the spool in an orderly manner and with a bending radius which does not excessively bend the fibers which could otherwise interfere with fiber optic transmissions through the fiber. Another example of a fiber optic cabinet is U.S. Pat. No. 5,093,885. This cabinet contains connectors on a front panel. It also contains a splice tray which can be stored on shelves within the cabinet. The splice tray contains splice holders for splicing two fibers together. Also, U.S. Pat. No. 5,208,894 teaches a fiber optic splice cabinet having a plurality of sliding drawers contained within the cabinet. Each of the drawers contains a splice holder for holding multiple splices. Each of the trays contains cable guides for storing lengths of cable associated with the splices. The cabinet includes a side compartment for admitting a bundle of fibers to the interior of the cabinet for ultimate distribution of individual fibers to the various trays contained within the cabinet.

It is an object of the present invention to provide a cabinet which can retain fibers and permit holding excess lengths of fibers in an improved manner. Additionally, it is an object of the present invention to provide such a cabinet which can provide splice functions within the cabinet.

II. SUMMARY OF THE INVENTION

According to a preferred embodiment of the present invention, a fiber optic cabinet and fiber tray are disclosed. The cabinet includes walls defining an interior with an access opening on the front of the cabinet. The cabinet contains aligned guides disposed within the interior on opposite sides of the opening. The splice tray includes a generally planar tray base having a tray axis which is orthogonal to the base. The tray base has a peripheral edge sized for opposing portions of the edge to be slidably engaged with opposing ones of the aligned cabinet guides. The tray is slidably engaged with the cabinet guides when the tray base is in any one of a multiple of rotational positions about the tray axis. A fiber pathway guide is carried on the tray for receiving a wound amount of optical fiber on the guide as the tray base is rotated about the tray axis.

III. BRIEF DESCRIPTION OF THE DRAWINGS

IV. DETAILED DESCRIPTION OF THE PREFERRED EMBODIMENT

Referring now to the several drawing figures in which identical elements are numbered identically throughout, a description of a first embodiment of the present invention will now be provided.

Figure 1:
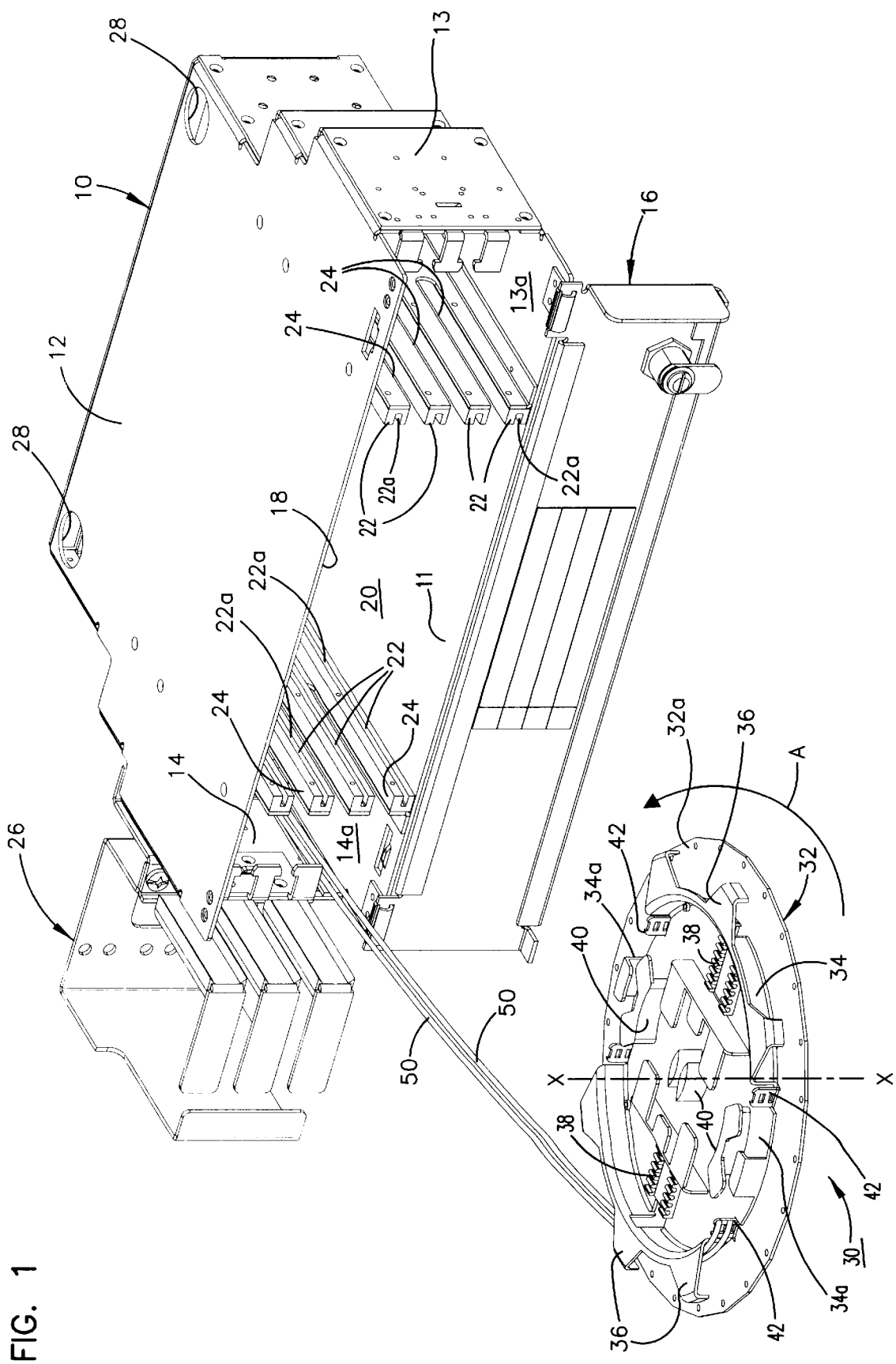
FIG. 1 is a front, top and right side perspective view of a cabinet according to the present invention and with a tray shown removed from the cabinet and with the tray shown without a cover.
Figure 2:
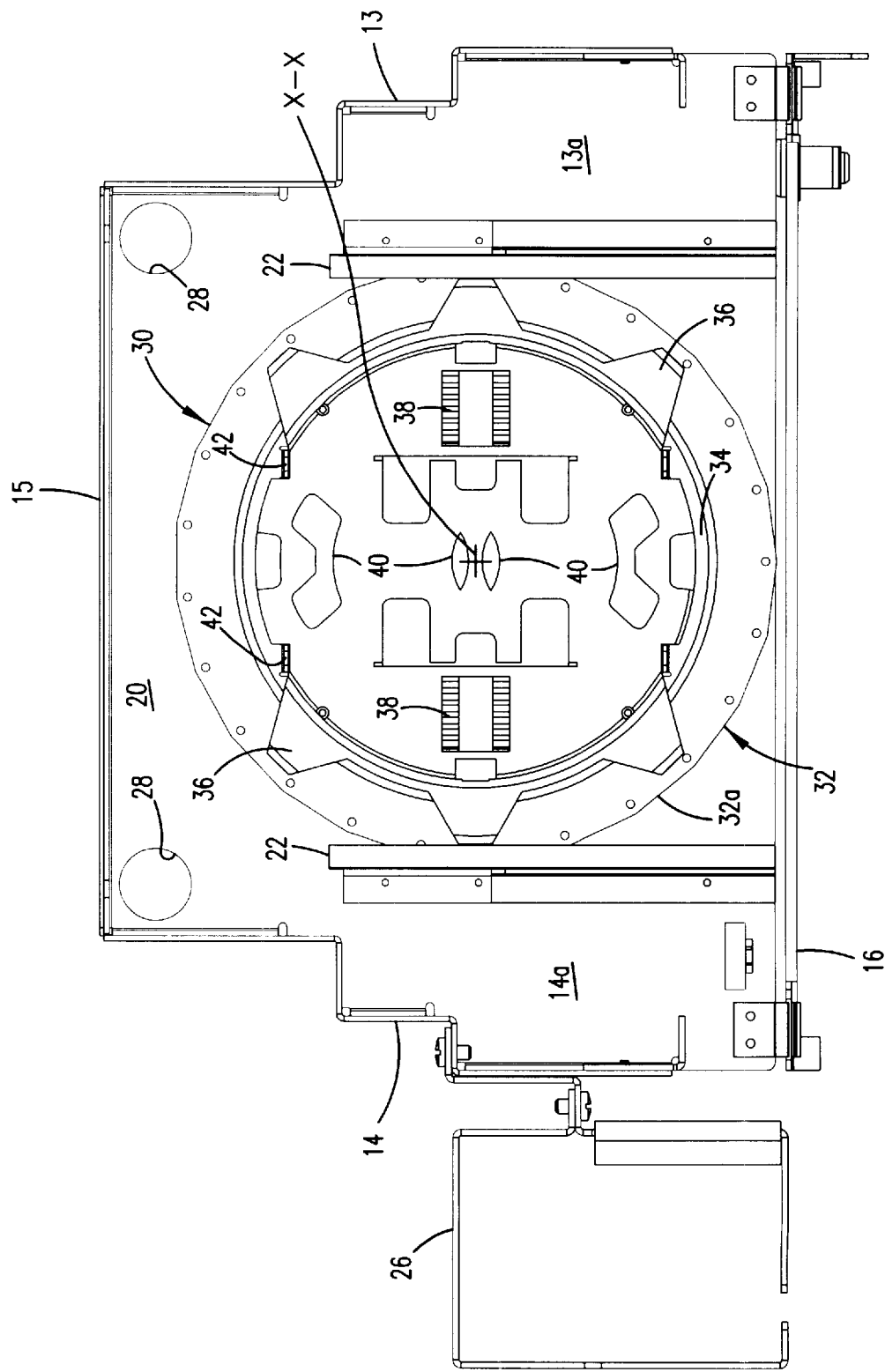
FIG. 2 is a top plan view of the cabinet of FIG. 1 with a top wall removed to expose a tray received within the cabinet.

In FIGS. 1 and 2, a cabinet 10 is shown having a plurality of walls including a top wall 12, a bottom wall 11, and the side walls 13, 14 and a rear wall 15. A front wall 16 is pivotally secured to the bottom wall 11 to pivot away to define an axis opening 18 to an interior 20 defined by the walls 11–15. A plurality of cabinet guides 22 are contained within the interior. The cabinet guides 22 are disposed adjacent to and spaced from the opposing side walls 13, 14. The guides 22 include a plurality of rails having grooves 22a extending from the front wall 16 toward the back wall 15 which each of the grooves 22a being parallel and with the grooves 22a adjacent side 14 being horizontally aligned with an individual one of a groove 22a adjacent to side wall 13. As shown, a gap 24 is provided between contiguous cabinet guides 22 with the gap 24 extending into the axis opening 18.

Spaces between the side walls 13, 14 and the guides 22 define side cabinets 13a, 14a. The gaps 24 between the adjacent guides 22 communicate with the side compartments 13a, 14a. Secured to the side wall 14 is a retaining clip 26 to retain and organize bundles of fiber optic cables.

The top and bottom walls 11, 12 include holes 28 communicating with the interior 20 such that bundles of fiber optic cables may be passed through the holes 28 into the interior 20 and distributed to the side compartments 13a, 14a for subsequent distribution through the gaps 24.

A novel splice tray 30 is provided to be received within the interior 20 and slidably engaged with each of the rails of the cabinet guides 22. In the examples of FIGS. 1 and 2, there are four pairs of aligned cabinet guides 22. Accordingly, the cabinet 10 as shown could retain four splice trays 30. It will be appreciated that this is a representative example and that by simply adjusting the height of the side walls 13, 14, more or fewer guide rails 22 could be added to the interior of the cabinet 10 to accommodate more or fewer splice trays 30 as might be desired.

The splice tray 30 includes a generally flat, planar circular base 32. The tray base 32 is sized to extend between the horizontally aligned guides 22 such that the tray base 32 may be received within the grooves 22a of horizontally aligned guides 22. The tray base 32 has a center axis X—X which is orthogonal to the plane of the tray base 32. The tray base 32 is rotatable about the axis X—X. The tray base 32 can be received within the grooves 22a of the cabinet guides 22 when the tray base 32 is in any one of its rotational positions about the axis X—X.

Figure 3:
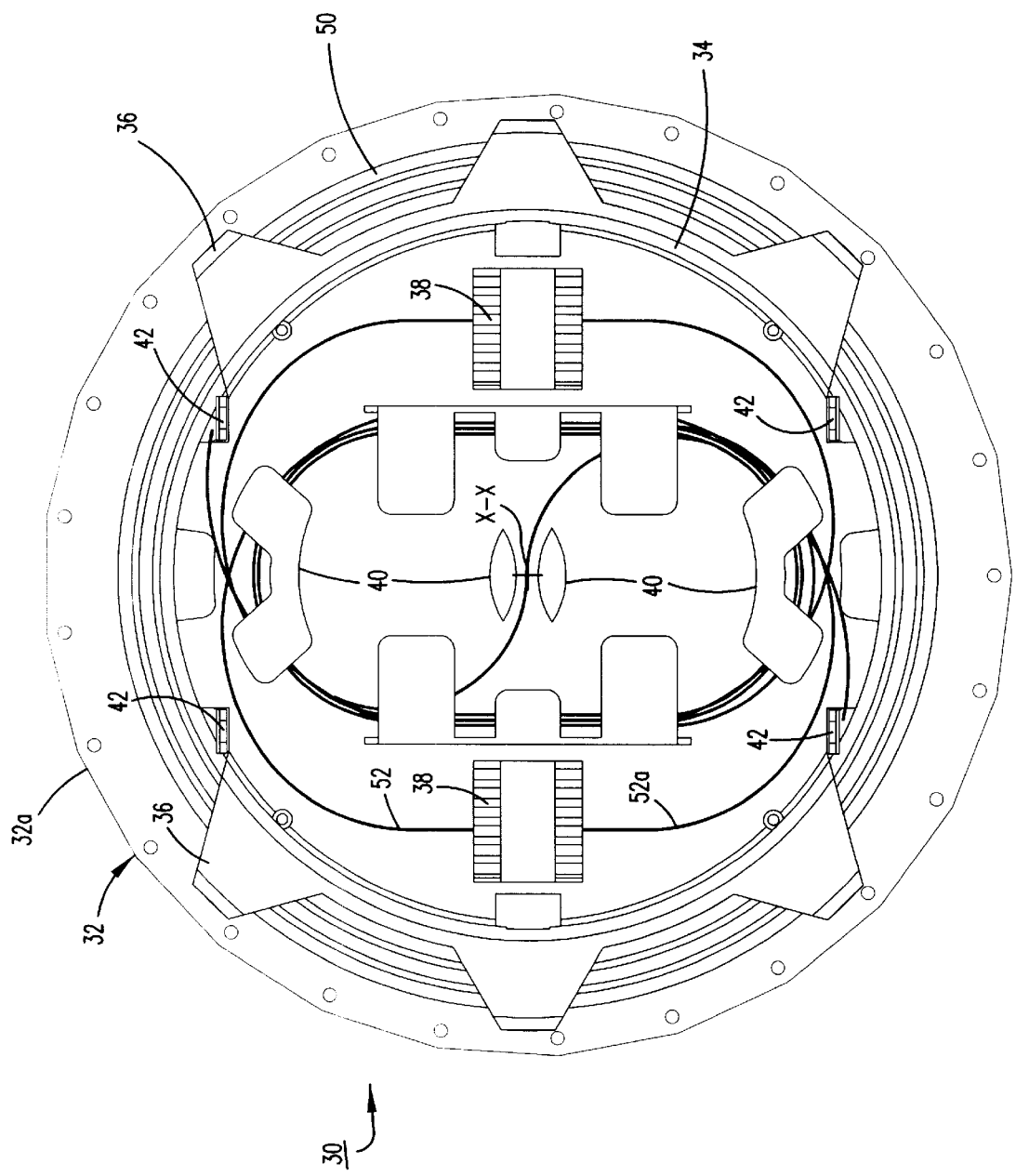
FIG. 3 is a top plan view of a first embodiment of a tray according to the present invention with fiber optic cables wound on the tray.
Figure 4:
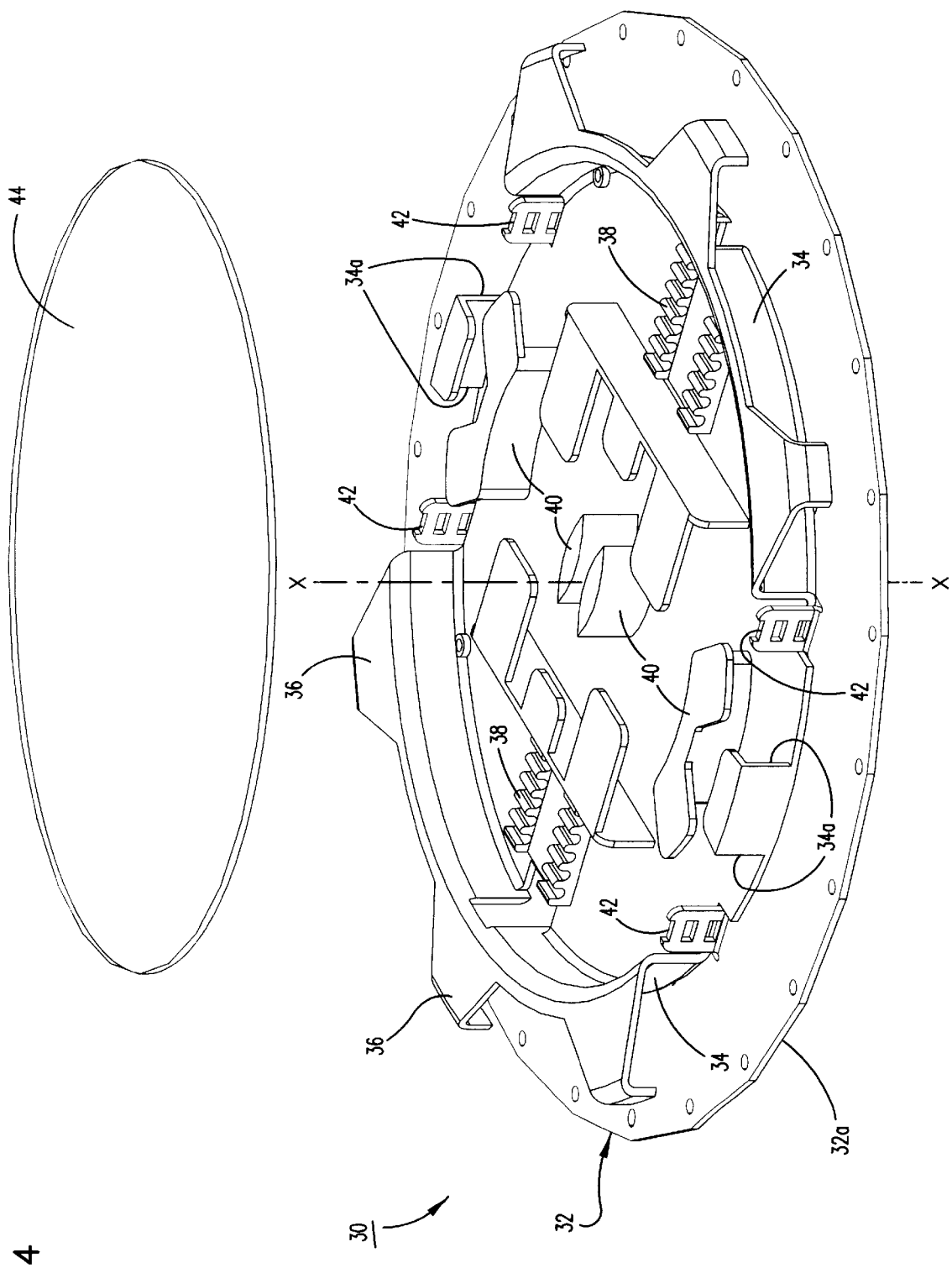
FIG. 4 is an exploded view of the tray of FIG. 3 and a cover and without cables being wound on the tray of FIG. 4.

Shown best in FIGS. 3 and 4, the tray base 32 does not have a precisely circular peripheral edge 32a. Instead, the peripheral edge 32a is a plurality of flat or linear segments joined to approximate a circular peripheral edge 32. The use of flat side edges 32a results in an increased amount of material of the tray base 32 which is received within the grooves 22a. As a result, additional material of the tray base 32 is received within the grooves 22a of the guides 22 in order to more fully support the splice tray 30 within the guides 22. It is desirable that the diameter of the tray base 32 is sized so that the tray base 32 is rotatable even when slidably received within the guides 22. However, as an alternative design, the tray base 32 could be designed such that diametrically opposite flats 32a are spaced apart approximately equal to a distance between the spacing of the opposing guides 22 such that once the tray base 32 is slidably received within the guides 22, the flats 32a would prevent rotation of the tray 30 within the guides 22a. However, for reasons that will become apparent, such is not a preferred embodiment of the present invention.

A spool 34 is provided on an upper surface of the tray base 32. The spool 34 includes portions of a cylindrical wall with an outer surface of the spool 34 defining a first fiber pathway guide spaced inwardly from the peripheral edge 32a. The spool 34 includes retaining clips 36 which project radially outward from an upper edge of the spool 34. The retaining clips 36 secure fiber optic cables within the first fiber pathway guide, as will be described. A cylindrical axis of the spool 34 is colinearly positioned relative to the tray axis X—X.

Positioned on the tray base 32 and contained within the interior of the spool 34 are splice holders 38. The splice holders 38 are positioned on diametrically opposite sides of the axis X—X. Cable routing guides 40 are also positioned within the interior of the spool 34.

As shown, the spool 34 is not a complete cylinder but only portions of a cylindrical wall such that gaps 34a are provided through the spool 34. The gaps in combination with the cable routing guides 40 define second fiber pathway guides for passing an optical fiber from the first fiber pathway guide to the interior of the spool 34 and for passing the individual fibers to the splice holders 38.

When splicing two fibers together, it is desirable that the two fibers face one another in optical alignment. In the event all cables are wound on the spool 34 in the same direction, with a clockwise winding (arrow A in FIG. 1) on the spool 34, it is necessary that one of the fibers of a pair to be spliced is realigned and reversed in direction so that it can conveniently oppose a mating fiber. The internal cable routing guides 40 permit a fiber to reverse its direction within the interior of the spool 34 so that it can be accurately aligned with a mating fiber.

At each of the gaps 34a, a plurality of tie clips 42 are provided. The tie clips 42 permit a tie mechanism (such as a string, tie, cord, etc.) to be attached to the tie clip 42 and surrounding the fibers.

With the construction thus described, fiber optic cables such as cables 50 in FIG. 1 may be passed through the hole 28 into the interior 20 of the cabinet 10. The cables 50 are passed to either of the side compartments 13a, 14a. With the splice tray 30 removed from the cabinet 10, the cables 50 may be trimmed to expose multiple fibers 52, 52a contained within each of the cables 50. The untrimmed ends of the cable 50 may be secured to the tie clips 42 as previously described.

The individual fibers 52 are passed through the gaps 34a into the interior of the spool 34 and routed through the cable routing guides 40 such that one of the fibers 52 is passed to the splice holder 38 in one direction and a mating fiber 52a has its direction reversed through the cable routing guides 40 such that it approaches the splice holder 38 in an opposite and aligned direction with fiber 52. Accordingly, the fibers 52, 52a may be spliced together with the splice held in the splice holder 38 (as is conventional). The cable routing guides 40 prevent excess bending of the fibers 52, 52a.

After all splices have been accomplished, the tray 30 is rotated about its axis X—X. As a result of such rotation, the fiber cables 50 are wound around the spool 34 in the first fiber pathway guide on spool 34. While the cables 50 are being wound onto the spool 34, the tray 30 is approaching the guides 22. When the tray 30 approaches the guides 22, the tray base 32 is slipped into the aligned grooves 22a such that the tray base 32 is slidably received within the guides 22. In the preferred embodiment, the tray base 32 is rotatable about its axis X—X even as the tray base 32 is slidably received within the guides 22. Accordingly, the cables 50 can pass through the gaps 24 between the guides 22 and the tray 30 can be rotated as it is advanced into the cabinet to continually wind lengths of the cables 50 onto the spool 34 until the tray base is completely received within the interior 20 of the cabinet 10. At this point, the front panel 16 of the cabinet 10 may be pivoted to a closed position to prevent accidental damage to cables and other elements stored within the interior of the cabinet 10.

After the interior fibers 52, 52a are routed and finally positioned within the interior of the spool 34, a cover 44 (FIG. 4) may be secured over the spool 34 to protect fibers and splices within the interior of the spool 34. As the cables are being wound onto the splice tray 30, the retaining clips 36 keep the cables 50 from inadvertently slipping off of the spool 34. At all times, the spool 34 and cable guides 40 prevent excess bending of the cables and fibers.

Figure 5:
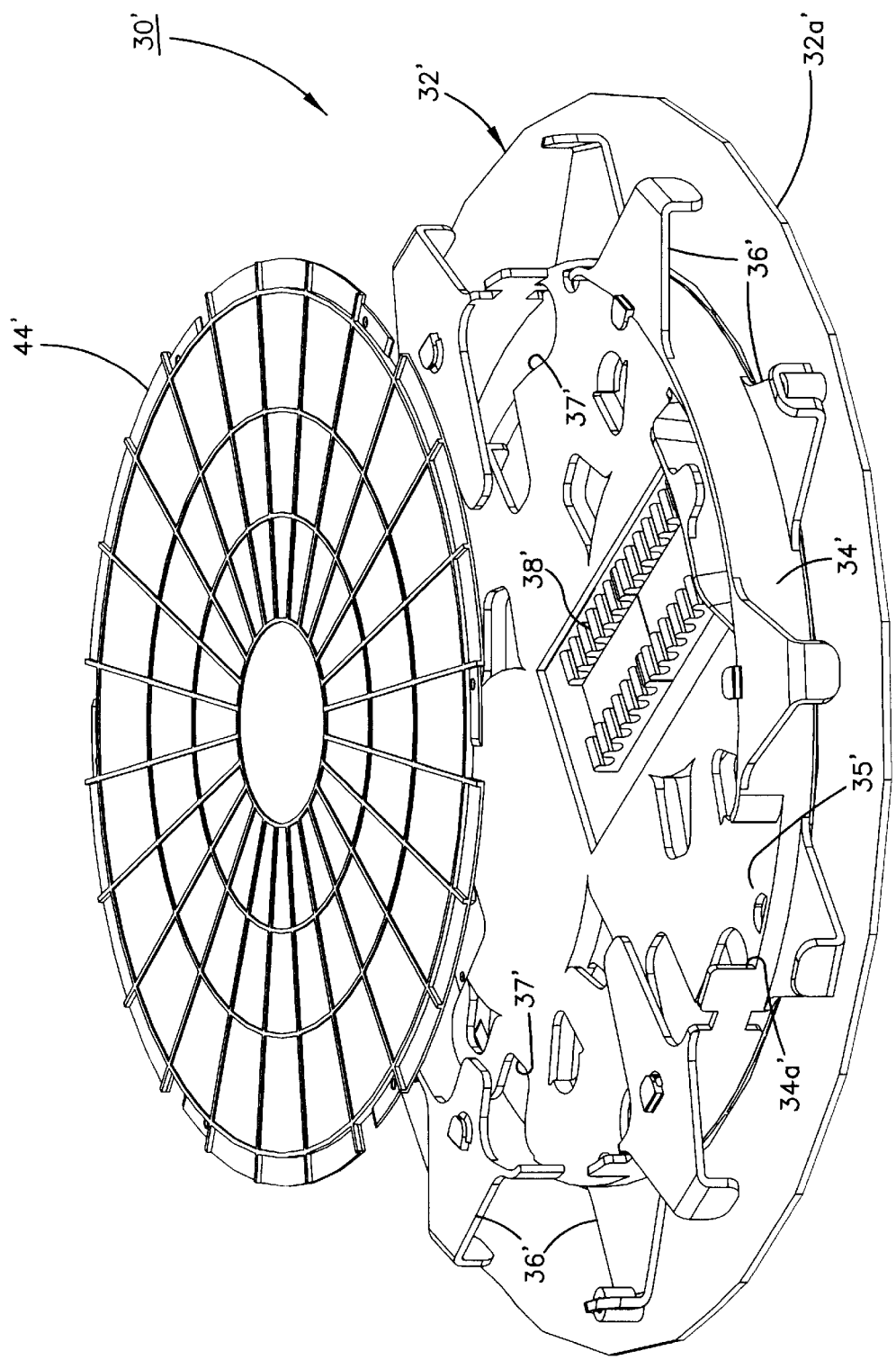
FIG. 5 is a perspective view of a tray and exploded cover of a second embodiment of a tray of the present invention and without fibers being contained on the tray.
Figure 6:
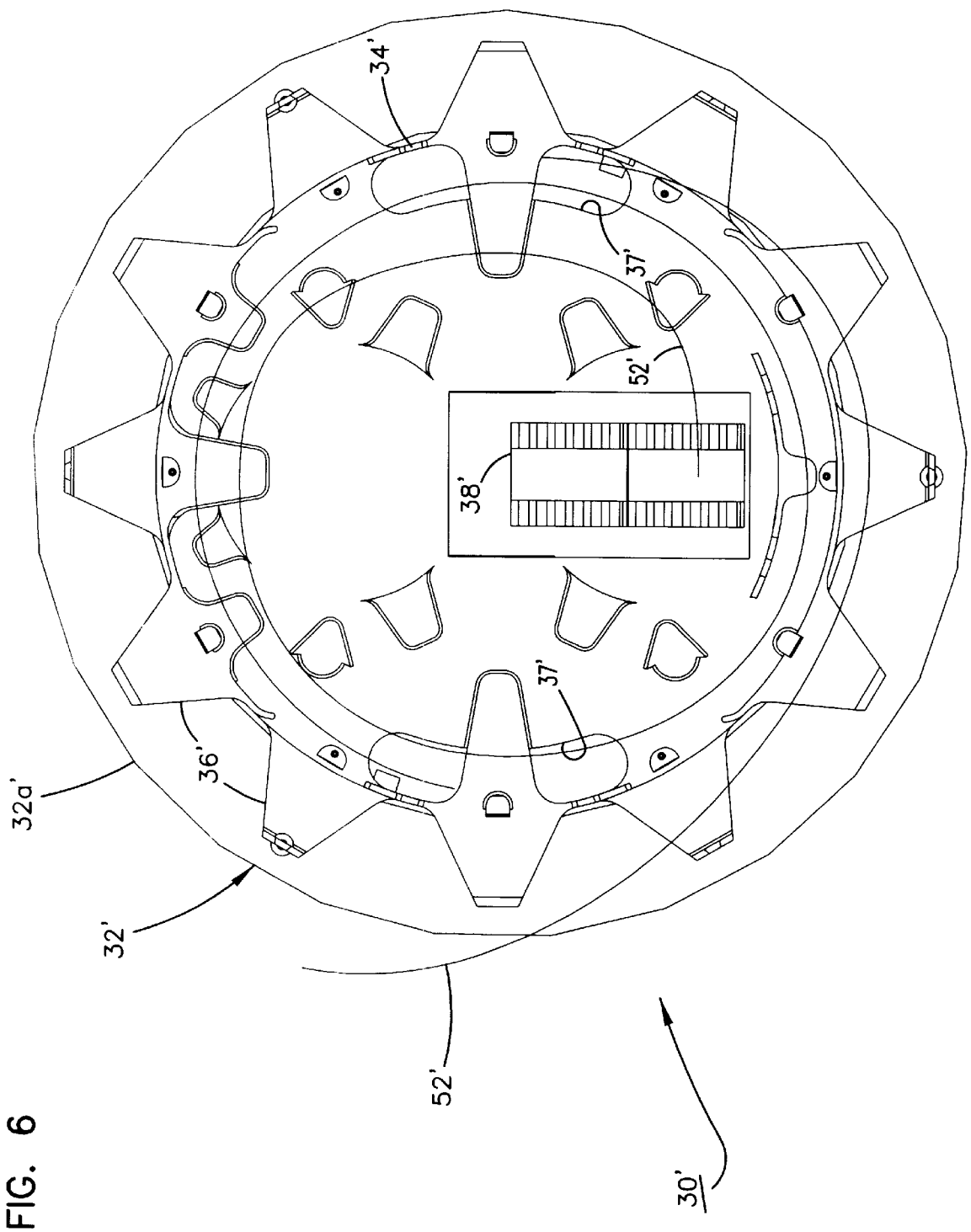
FIG. 6 is a top plan view of the tray of FIG. 5 with a cover removed and showing a fiber wound on the tray.
Figure 7:
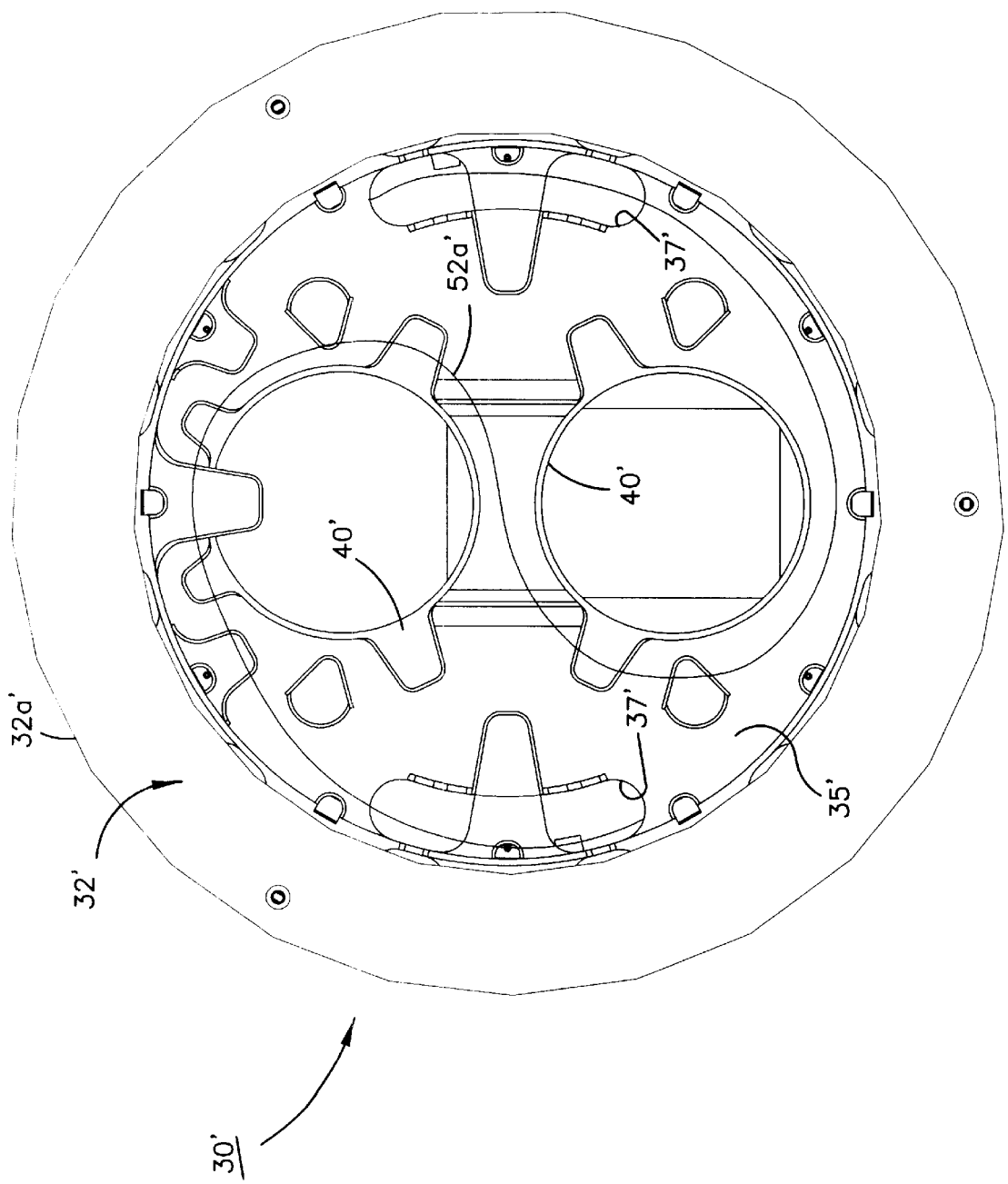
FIG. 7 is the bottom plan view of the tray of FIG. 5 and without a cover and showing a fiber wound on the tray.

FIGS. 5 through 7 illustrate an alternative embodiment of splice tray 30. Elements of second embodiment splice tray 30' which are functionally in common with elements of splice tray 30 are numbered identically with the addition of an apostrophe to distinguish the embodiments.

The splice tray 30' includes a circular base 32' with flats on the peripheral edge 32a' such that the tray base 32' is rotatable about its orthogonal axis as well as being slidable within the guides 22 of the cabinet 10.

A first fiber pathway guide in the form of a spool 34' is positioned on the base 32'. The spool 34' includes a platform 35' which is parallel to and spaced from the plane of the base 32'. An upper surface of the platform 35' contains the splice holders 38'. A gap 34a' in the spool 34' permits fibers to be passed from the spool into the interior of the spool 34' on the surface of the platform 35' on which the splice holders 38' are positioned. Openings 37' are formed through the platform 35' so that individual fibers may be passed from the upper surface of the platform 35' to the lower surface of the platform 35'. The lower surface of the platform 35' contains spaced apart cable routing guides 40' in the form of spools with retaining clips 42'. A cover 44' is provided for releasable attachment to the upper surface of the platform 35' to cover individual fibers and the splice holders 38'. With the description of the structure of the alternative splice tray 30', it will be appreciated that cables 50 may be secured and routed to the external surface of the spool 34' in the same manner that cables 50 are attached to the external surface of the spool 34 of the embodiment of FIG. 3. Individual fibers from the cables are passed through the gaps 34a into the interior of the spool 34' above the upper surface of the platform 35'. Selective ones 52' of the fibers can be passed directly to the splice holder 38'.

When it is desirable to reverse the direction of a fiber 52a' so that it may mate with a fiber 52' on the splice holder 38', the fiber 52a' is passed through the openings 37' to the bottom side of the platform 35'. The fiber 52a' is then routed around the opposing spools 40' so that the fiber 52a' travels in a S-shaped path to reverse its direction of travel and the fiber 52a' is then passed through the openings 37' back to the upper surface of the platform 35' so that the fiber 52a' can be placed in alignment with the fiber 52' in the splice holders 38' and spliced together.

It will be appreciated that the structure of the embodiment of FIGS. 5 through 7 differs from that of FIGS. 3 and 4 in that the cable routing guides 40' which reverse the travel of a fiber are placed on the bottom surface of the platform 35' whereas the function of reversing the travel of the fiber in the embodiment of FIGS. 3 and 4 occurs in the same layer of the splice tray 30 as the splice holders 38.

From the foregoing detailed description of the present invention, it has been shown how the objects of the invention have been attained in a preferred manner. Modifications and equivalence of the disclosed concepts such as those which readily occur to one skilled in the art are intended to be included within the scope of the claims which are appended hereto.

What is claimed is:

1. An optical fiber tray for a cabinet having walls defining an interior and an opening providing access to the interior, the cabinet further having aligned cabinet guides disposed within the interior on opposite sides of the opening, the tray comprising:
    a generally planar tray base having a tray axis orthogonal to the base;
    the base having a peripheral edge sized for opposite portions of the peripheral edge to be slidably engaged with opposing ones of the aligned cabinet guides when the tray base is in any one of multiple rotational positions about the tray axis and with the tray slidable through the opening into the cabinet interior;
    a first fiber pathway guide carried on the tray base for receiving a wound amount of optical fiber on the guide as the tray base is rotated about the tray axis;
    an optical fiber tie location configured and arranged for receiving a tie mechanism for tying the optical fiber to the tray.

2. An optical fiber tray according to claim 1 wherein the tray base is rotatable about the tray axis when the tray base is slidably received within the cabinet guides.

3. An optical fiber tray according to claim 1 wherein the tray base is slidably engaged with the aligned cabinet guides only when the tray base is in any one of a plurality of discrete rotational positions about said tray axis and relative to the cabinet guides.

4. An optical fiber tray according to claim 1 wherein the tray base includes portions cooperating with the cabinet guides to prevent rotation of the tray base about the tray axis when the tray base is slidably engaged with the cabinet guides.

5. An optical fiber tray according to claim 4 wherein the portions include a plurality of pairs of parallel flat portions of the peripheral edge with ones of each pair on diametrically opposite sides of the tray base and spaced apart by a distance approximate to a spacing between the aligned cabinet guides.

6. An optical fiber tray according to claim 1 wherein the first fiber pathway guide is a spool carried on the tray base and dimensioned to be recessed from the peripheral edge and having a spool axis colinear with the tray axis.

7. An optical fiber tray according to claim 6 wherein the spool includes at least portions of a cylindrical wall having a cylindrical axis colinear with the tray axis and with the portions of the cylindrical wall secured to the tray base and spaced inwardly from the tray peripheral edge.

8. An optical fiber tray according to claim 7 further comprising retaining clips on a side of the portions of the cylindrical wall opposite the tray base.

9. An optical fiber tray according to claim 1 further comprising a fiber optic splice holder secured to the tray base and positioned radially inwardly from the first fiber pathway guide and the first fiber pathway guide defining a fiber pathway for passage of a fiber from the first fiber pathway guide toward the fiber optic splice holder.

10. An optical fiber tray according to claim 9 wherein the fiber optic splice holder is secured to a first side of a platform secured to the tray base; an opposite second side of the platform having cable routing members and openings formed through the platform to pass a cable from the first side to the second side of the platform.

11. An optical fiber tray according to claim 10 wherein the cable routing members are adapted to reverse a direction of winding of a cable.

12. An optical fiber tray according to claim 11 wherein the cable routing members include two spaced-apart secondary spools on the second side of the platform.

13. An optical fiber tray according to claim 9 further comprising a second fiber pathway guide for guiding a fiber from the first fiber pathway guide to the fiber optic splice holder.

14. An optical fiber tray according to claim 7 further comprising:
    a first fiber optic splice holder secured to the tray base and positioned radially inwardly from the spool;
    and opposing ones of the portions of the cylindrical wall defining a fiber pathway for passage of a fiber from the spool toward the first fiber optic splice holder.

15. An optical fiber tray according to claim 14 further comprising a second fiber pathway guide for guiding a fiber from the spool to the first fiber optic splice holder.

16. An optical fiber tray according to claim 15 further comprising:
    a second first fiber optic splice holder secured to the tray base and positioned radially inwardly from the spool and with the first and second fiber optic splice holders disposed on opposite sides of the tray axis;
    the second fiber pathway guide adapted to guide a fiber from the spool to either of the first and second fiber optic splice holders.

17. An optical fiber tray according to claim 15 further comprising a bracket for securing to a fiber passing from the spool to the second fiber pathway guide.

18. An optical fiber tray according to claim 14 further comprising a cover for removable connection to the spool for covering the first fiber optic splice holder.

19. An optical fiber tray for a cabinet having walls defining an interior and an opening providing access to the interior, the cabinet further having aligned guides disposed within the interior on opposite sides of the opening, the splice tray comprising:
- a generally planar tray base having a tray axis orthogonal to the base;
- the base having a peripheral edge sized for opposite portions of the peripheral edge to be slidably engaged with opposing ones of the aligned guides regardless of a rotational position of the tray base about the tray axis and with the tray slidable through the opening into the cabinet interior;
- a first fiber splice holder carried on the tray base for providing a site for splicing optical fibers;
- a first fiber pathway guide carried on the tray base for receiving a wound amount of optical fiber on the guide as the tray base is rotated about the tray axis;
- an optical fiber tie location configured and arranged for receiving a tie mechanism for tying the optical fiber to the tray.

20. An optical fiber tray according to claim 19 further comprising:
- a spool carried on the tray base and dimension to be recessed from the peripheral edge and having a spool axis colinear with the tray axis;
- the spool having openings to pass a fiber from the exterior of the spool into an interior of the spool;
- the first fiber splice holder positioned in the interior of the spool.

21. An optical fiber tray according to claim 20 further comprising a second first fiber optic splice holder secured to the tray base and positioned radially inwardly from the spool and with the first and second fiber optic splice holders disposed on opposite sides of the tray axis.

22. A combination fiber optic cabinet and tray comprising:
- a cabinet having:
  - walls defining an interior and an opening providing access to the interior;
  - aligned guides disposed within the interior on opposite sides of the opening;
- a splice tray having:
  - a generally planar tray base having a tray axis orthogonal to the base;
  - the base having a peripheral edge sized for opposite portions of the peripheral edge to be slidably engaged with opposing ones of the aligned guides regardless of a rotational position of the tray base about the tray axis and with the tray slidable through the opening into the cabinet interior;
  - a first fiber pathway guide carried on the tray base for receiving a wound amount of optical fiber on the guide as the tray base is rotated about the tray axis;
  - an optical fiber tie location configured and arranged for receiving a tie mechanism for tying the optical fiber to the tray.

23. A combination according to claim 22 wherein the cabinet includes a side compartment for passage of fiber optic cables.

24. A combination according to claim 23 wherein said cabinet includes internal passages from the side compartment to the interior for passage of cables from the side compartment into the interior.

25. A combination according to claim 24 wherein the cabinet includes multiple ones of the aligned guides and the internal passages are formed between contiguous ones of the aligned guides.

26. An optical fiber splice tray comprising:
- a generally planar tray base having a tray axis orthogonal to the base, the base having a generally circular peripheral edge;
- a first fiber pathway guide carried on the tray base for receiving a wound amount of optical fiber on the guide as the tray base is rotated about the tray axis, wherein the first fiber pathway guide is a spool carried on the tray base and dimensioned to be recessed from the peripheral edge and having a spool axis colinear with the tray axis, wherein the spool includes at least portions of a cylindrical wall having a cylindrical axis colinear with the tray axis and with the portions of the cylindrical wall secured to the tray base and spaced inwardly from the tray peripheral edge, and a first plurality of retaining clips on a side of the portions of the cylindrical wall opposite the tray base and extending radially outwardly;
- a fiber optic splice holder secured to the tray base and positioned radially inwardly from the first fiber pathway guide, and the first fiber pathway guide defining a fiber pathway for passage of a fiber from the first fiber pathway guide toward the fiber optic splice holder, wherein the fiber optic splice holder is secured to a first side of the tray base; an opposite second side of the tray base having fiber routing members and openings formed through the tray base to pass a fiber from the first side to the second side of the tray base, wherein the fiber routing members are adapted to reverse a direction of winding of a fiber.

27. An optical fiber tray according to claim 26 wherein the fiber routing members include two spaced-apart secondary spools on the second side of the tray base.

28. An optical fiber tray according to claim 26 further comprising a second plurality of retaining clips on the side of the portions of the cylindrical wall opposite the tray base and extending radially inwardly.

29. An optical fiber tray according to claim 26, wherein the peripheral edge defines a plurality of pairs of parallel flat portions defining the generally circular peripheral edge.

30. An optical fiber tray according to claim 26, further comprising an optical fiber tie location configured and arranged for receiving a tie mechanism for tying the optical fiber to the tray.

31. An optical fiber tray according to claim 30, further comprising a releasable cover disposed to cover an area radially inwardly from the first fiber pathway guide, the area including the fiber optic splice holder.

32. An optical fiber tray according to claim 31 wherein the first plurality of retaining clips each includes a lip extending toward the tray base.

33. An optical fiber tray according to claim 32, further comprising a second plurality of retaining clips extending from the tray base in an opposite direction to the lips of the first plurality of retaining clips.

34. An optical fiber tray according to claim 26, further comprising a releasable cover disposed to cover an area radially inwardly from the first fiber pathway guide, the area including the fiber optic splice holder.

35. An optical fiber tray according to claim 26 wherein the first plurality of retaining clips each includes a lip extending toward the tray base.

36. An optical fiber tray according to claim 35, further comprising a second plurality of retaining clips extending from the tray base in an opposite direction to the lips of the first plurality of retaining clips.

37. An optical fiber splice tray comprising:

a generally planar tray base having a tray axis orthogonal to the base, the base having a generally circular peripheral edge;

a first fiber pathway guide carried on the tray base for receiving a wound amount of optical fiber on the guide as the tray base is rotated about the tray axis, wherein the first fiber pathway guide is a spool carried on the tray base and dimensioned to be recessed from the peripheral edge and having a spool axis colinear with the tray axis, wherein the spool includes at least portions of a cylindrical wall having a cylindrical axis colinear with the tray axis and with the portions of the cylindrical wall secured to the tray base and spaced inwardly from the tray peripheral edge;

a first plurality of retaining members on a side of the portions of the cylindrical wall opposite the tray base and extending radially outwardly, at least one of the retaining members including a lip extending toward the tray base;

a fiber optic splice holder secured to the tray base and positioned radially inwardly from the first fiber pathway guide, and the first fiber pathway guide defining a fiber pathway for passage of a fiber from the first fiber pathway guide toward the fiber optic splice holder, wherein the fiber optic splice holder is secured to a first side of the tray base;

the tray base having fiber routing members, wherein the fiber routing members are adapted to reverse a direction of winding of a fiber.

38. The optical fiber tray according to claim 37, wherein the fiber routing members are on an opposite second side of the tray base to the fiber optic splice holder, and wherein the tray base includes an opening therethrough to pass a fiber from the first side to the second side.

39. An optical fiber tray according to claim 38, further comprising an optical fiber tie location configured and arranged for receiving a tie mechanism for tying the optical fiber to the tray.

40. An optical fiber tray according to claim 38 wherein the fiber routing members include two spaced-apart secondary spools on the second side of the tray base.

41. An optical fiber tray according to claim 37 wherein the fiber routing members are on the first side of the tray base centered over the tray axis.

42. An optical fiber tray according to claim 41, further comprising an optical fiber tie location configured and arranged for receiving a tie mechanism for tying the optical fiber to the tray.

43. An optical fiber tray according to claim 41, wherein the fiber optic splice holder is a first fiber optic splice holder, and further comprising a second fiber optic splice holder secured to the tray base on a first portion of the first side of the tray base opposite to a location of the first fiber optic splice holder on a second portion of the first side of the tray base.

44. An optical fiber tray according to claim 37 further comprising a second plurality of retaining members on the side of the portions of the cylindrical wall opposite the tray base and extending radially inwardly.

45. An optical fiber tray according to claim 37, wherein the peripheral edge defines a plurality of pairs of parallel flat portions defining the generally circular peripheral edge.

46. An optical fiber splice tray comprising:

a generally planar tray base having a tray axis orthogonal to the base, the base having a generally circular peripheral edge;

a first fiber pathway guide carried on the tray base for receiving a wound amount of optical fiber on the guide as the tray base is rotated about the tray axis, wherein the first fiber pathway guide is a spool carried on the tray base and dimensioned to be recessed from the peripheral edge and having a spool axis colinear with the tray axis, wherein the spool includes at least portions of a cylindrical wall having a cylindrical axis colinear with the tray axis and with the portions of the cylindrical wall secured to the tray base and spaced inwardly from the tray peripheral edge;

a first plurality of retaining members on a side of the portions of the cylindrical wall opposite the tray base and extending radially outwardly;

a fiber optic splice holder secured to the tray base and positioned radially inwardly from the first fiber pathway guide, and the first fiber pathway guide defining a fiber pathway for passage of a fiber from the first fiber pathway guide toward the fiber optic splice holder, wherein the fiber optic splice holder is secured to a first side of the tray base;

the tray base having fiber routing members, wherein the fiber routing members are adapted to reverse a direction of winding of a fiber;

an optical fiber tie location on the spool configured and arranged for receiving a tie mechanism for tying the optical fiber to the tray.

47. An optical fiber tray according to claim 46, wherein the fiber routing members are on an opposite second side of the tray base to the fiber optic splice holder, and wherein the tray base includes an opening therethrough to pass a fiber from the first side to the second side.

48. An optical fiber tray according to claim 47 wherein the fiber routing members include two spaced-apart secondary spools on the second side of the tray base.

49. An optical fiber tray according to claim 46 wherein the fiber routing members are on the first side of the tray base centered over the tray axis.

50. An optical fiber tray according to claim 49, wherein the fiber optic splice holder is a first fiber optic splice holder, and further comprising a second fiber optic splice holder secured to the tray base on a first portion of the first side of the tray base opposite to a location of the first fiber optic splice holder on a second portion of the first side of the tray base.

51. An optical fiber tray according to claim 46 further comprising a second plurality of retaining members on the side of the portions of the cylindrical wall opposite the tray base and extending radially inwardly.

52. An optical fiber tray according to claim 46, wherein the peripheral edge defines a plurality of pairs of parallel flat portions defining the generally circular peripheral edge.

* * * * *

UNITED STATES PATENT AND TRADEMARK OFFICE
CERTIFICATE OF CORRECTION

PATENT NO. : 6,215,938 B1
DATED : April 10, 2001
INVENTOR(S) : Reitmeier et al.

Page 1 of 1

It is certified that error appears in the above-identified patent and that said Letters Patent is hereby corrected as shown below:

<u>Title page,</u>
Item [56] References Cited, after U.S. PATENT DOCUMENTS: add:

-- 4,798,432   01/1989   Becker et al.
4,995,688   02/1991   Anton et al.
5,802,237   09/1998   Pulido --

After FOREIGN PATENT DOCUMENTS: add

-- 27 21 300 A1   11/1978   (DE)
35 32 313 A1   03/1987   (DE)
WO 96/19745   06/1996   (WO) --

Signed and Sealed this

Twenty-first Day of May, 2002

Attest:

*Attesting Officer*

JAMES E. ROGAN
*Director of the United States Patent and Trademark Office*